(12) United States Patent
Hwangbo et al.

(10) Patent No.: US 11,055,554 B2
(45) Date of Patent: Jul. 6, 2021

(54) DYNAMIC IMAGE REGION SELECTION FOR VISUAL INFERENCE

(71) Applicant: Phantom AI, Inc., Burlingame, CA (US)

(72) Inventors: Myung Hwangbo, Palo Alto, CA (US); Hyunggi Cho, Palo Alto, CA (US); Gordon Huang, Campbell, CA (US); Filip Dziwulski, Foster City, CA (US); Jaehyung Choi, San Mateo, CA (US)

(73) Assignee: PHANTOM AI, INC., Burlingame, CA (US)

( * ) Notice: Subject to any disclaimer, the term of this patent is extended or adjusted under 35 U.S.C. 154(b) by 157 days.

(21) Appl. No.: 16/372,217

(22) Filed: Apr. 1, 2019

(65) Prior Publication Data
US 2019/0303698 A1    Oct. 3, 2019

Related U.S. Application Data

(60) Provisional application No. 62/651,654, filed on Apr. 2, 2018.

(51) Int. Cl.
*G06K 9/62* (2006.01)
*G06K 9/20* (2006.01)
(Continued)

(52) U.S. Cl.
CPC ....... *G06K 9/2054* (2013.01); *G06K 9/00791* (2013.01); *G06K 9/726* (2013.01); *G06T 3/40* (2013.01)

(58) Field of Classification Search
CPC .. G06K 9/2054; G06K 9/00791; G06K 9/726; G06K 9/6267; G06K 9/3233; G06T 3/40; G06T 3/4053
(Continued)

(56) References Cited

U.S. PATENT DOCUMENTS

| 2003/0080956 A1* | 5/2003 | Chang | G06T 11/206 345/419 |
| 2007/0127833 A1* | 6/2007 | Singh | G06F 16/583 382/254 |

(Continued)

OTHER PUBLICATIONS

Lambert, F., "Tesla Autopilot 2.0: next gen Autopilot powered by more radar, new triple camera, some equipment already in production," Electrek, Aug. 11, 2016, 7 pages [Online] [Retrieved May 29, 2019], Retrieved from the internet <URL: https://electrek.co/2016/08/11/tesla-autopilot-2-0-next-gen-radar-triple-camera-production/>.

(Continued)

*Primary Examiner* — Charlotte M Baker
(74) *Attorney, Agent, or Firm* — Fenwick & West LLP

(57) ABSTRACT

A region (e.g., a portion) of a full-size image is selected for analysis by a vision inference model. The region of the image may be dynamically selected for the image based on environmental characteristics of the image. These environmental characteristics may include semantic information about the environment that may be determined from a previous image of the environment, road structure information, control information, and motion information. These environmental characteristics may thus describe expected areas of interest in the image. The selected region of the full-size image is resized to a size compatible with a vision inference model which identifies semantic information about the current image. This semantic information may then be used to select a region of a subsequent image.

20 Claims, 4 Drawing Sheets

(51) Int. Cl.
   *G06T 3/40* (2006.01)
   *G06K 9/00* (2006.01)
   *G06K 9/72* (2006.01)

(58) Field of Classification Search
   USPC ........ 382/156, 254; 717/108, 120, 116, 137,
   717/104; 707/E17.026; 345/419
   See application file for complete search history.

(56) References Cited

U.S. PATENT DOCUMENTS

| | | |
|---|---|---|
| 2015/0234045 A1 | 8/2015 | Rosenblum et al. |
| 2017/0006261 A1 | 1/2017 | Debilde et al. |
| 2017/0185852 A1 | 6/2017 | Pliefke et al. |
| 2017/0323376 A1 | 11/2017 | Glaser et al. |

OTHER PUBLICATIONS

Tesla Tap, "Autopilot Triple Cameras," 2016, 3 pages [Online] [Retrieved May 29, 2019], Retrieved from the internet <URL: https://teslatap.com/articles/autopilot-triple-cameras/>.
PCT International Search Report and Written Opinion, PCT Application No. PCT/US19/25232, Jun. 26, 2019, 17 pages.

\* cited by examiner

_US 11,055,554 B2_

DYNAMIC IMAGE REGION SELECTION FOR VISUAL INFERENCE

CROSS REFERENCE TO RELATED APPLICATIONS

This application claims the benefit of U.S. Provisional Application No. 62/651,654, filed Apr. 2, 2018, which is hereby incorporated by reference in its entirety.

BACKGROUND

This invention relates generally to automatic semantic analysis of an environment, and particularly to automatic selection of a region in an image for the automatic semantic analysis.

Analysis of an environment shown in an image may be performed by a vision inference model. A vision inference model receives an image, typically of a specific resolution, such as 600×400, and identifies semantic information in the image, such as objects and other features of the environment in the image. As one example use, a vision inference model may be used in conjunction with a vehicle to identify objects near the vehicle, such as a vehicle under autonomous or semi-autonomous control. The vision inference model may be used in this scenario to identify various types of objects encountered on a road, such as cars, people, signs, lanes, lane markers, and so forth. These vision inference models may be various types of trained computer models, such as a neural network, that learns to identify various objects and characteristics of an environment based on a training set of a large number of images of objects.

Typically, however, imaging sensors may capture images at a significantly higher resolution than the resolution directly usable by the vision inference model. For example, an imaging sensor may capture an image at a resolution of 1920×1280, while the vision inference model may require an input image having a resolution of 480×320. In the typical case, the full-size image from the imaging sensor may be resized to the resolution of the vision inference model. This resizing can reduce the accuracy of analysis by the vision inference model, and can include portions of the full-size image that are not relevant to the vision inference model or to subsequent processing of the semantic information.

SUMMARY

To improve the relevance and accuracy of semantic information determined by a vision inference model, a portion of the full-size image is dynamically selected for the vision inference model. This selected portion may be used as an alternative to or in addition to a resized full-size image in the vision inference model to improve the semantic information determined by the vision inference model. The selected portion may change across various frames of images captured by the imaging sensor, permitting the selected portion to adapt to different conditions in the environment being imaged.

When a full-size image is captured, a set of environmental characteristics of the image are identified that describe the environment in which the full-size image was captured. These environmental characteristics can include semantic information from a previous image (e.g., objects identified in a prior video frame), as well as road structure information and control or motion information of a vehicle on which the imaging sensor is attached. These environmental characteristics may thus be used to identify which portions of the full-size image may be of interest, although the full-size image has not yet been analyzed by the visual inference model. For example, objects identified in a prior frame (or frames) may be used to increase or decrease the size of the selected region to include the previously-identified objects, while road curvature may be used to select a region towards where the road turns in the direction of travel of the vehicle. In addition, control or motion information may be used to select a region towards where the vehicle control moves the vehicle. As an example, when the vehicle is expected to move leftwards due to control or motion, the selection region may be moved leftward in the full-size image frame. Thus, these environmental characteristics may be used to determine both regions of interest and the likely future location of the vehicle, permitting the selection of a region most of interest to the vehicle in analyzing semantic information about that region.

The selected region may be identified by a set of rules, weights, or a trained model using the set of environmental characteristics. In some circumstances, the selected region may vary in size and aspect ratio. When the selected region is identified, the selected region may be resized to a predetermined size compatible with the vision inference engine. For example, a selected region may include 800×500 pixels, and may be resized for a vision inference engine that accepts a resolution of 600×400 pixels. After selecting the region, and if necessary, resizing the selected region, the selected region is input to the vision inference model to determine semantic information about the image.

Since the region of interest may change frame-by-frame as images are captured, this dynamic region selection permits more relevant portions of an image to be included for the image inference model and permits the image inference model to continue to effectively use a smaller resolution than the resolution of the full-size image captured by the imaging sensor.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
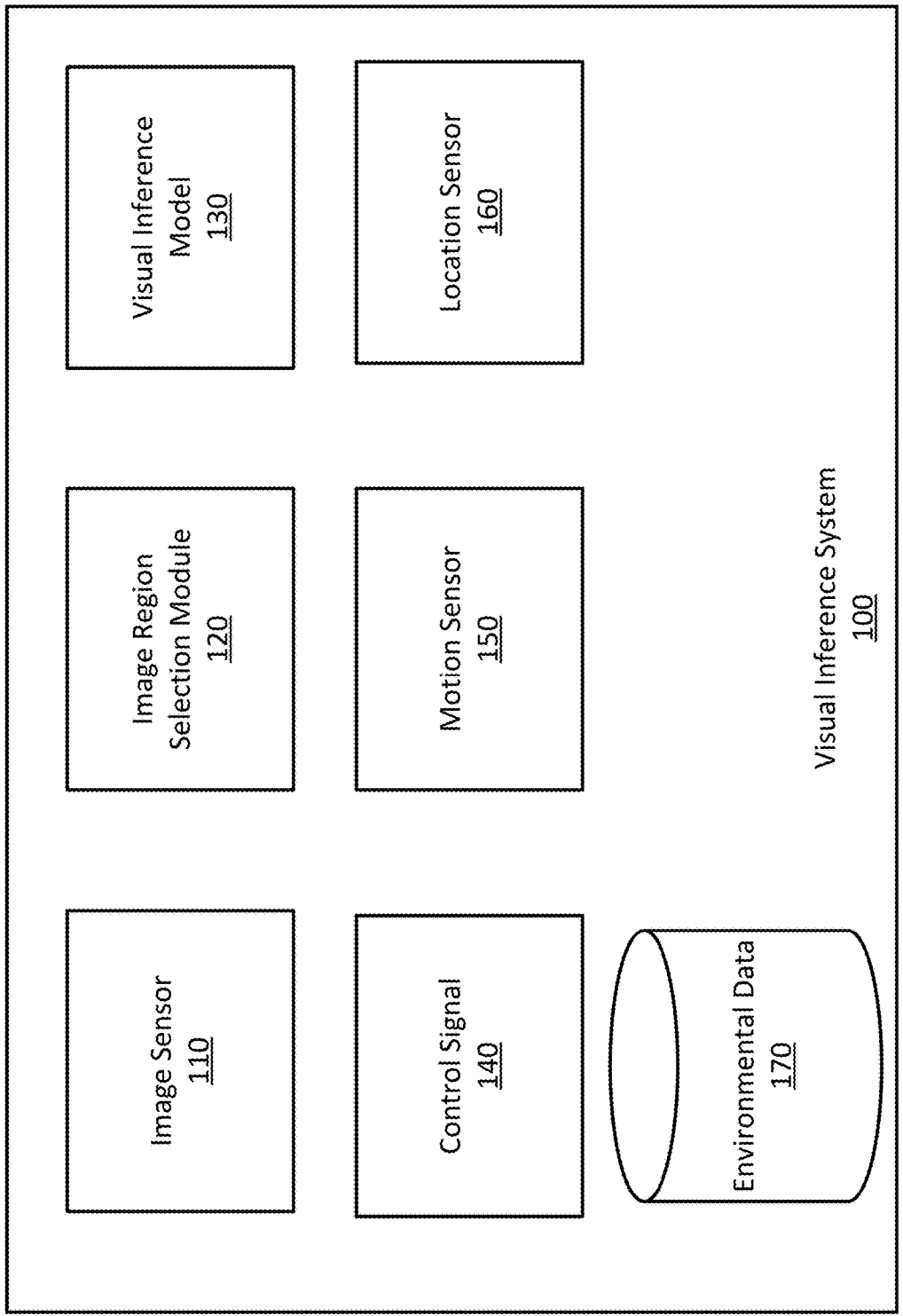
FIG. 1 illustrates an example vision inference system for semantic analysis of an environment depicted in an image.

FIG. 1 illustrates an example vision inference system 100 for semantic analysis of an environment depicted in an image. The semantic analysis of the environment provides semantic information about objects and characteristics of the environment. The vision inference system 100 may be a component of larger system that uses the images and semantic analysis generated by the visual inference system 100 for control and operation. As a typical example used herein, the visual inference system 100 may be a component of an autonomous or semi-autonomous vehicle and form a portion of a perception system for the vehicle. The autonomous or semi-autonomous vehicle may use the semantic information from the visual inference system 100 to identify objects and subsequently navigate the environment by controlling motion, power, brakes, and other control components of the vehicle. As examples, the semantic information generated by the visual inference system 100 may be used for automated breaking, automatically maintaining a following distance, or maintaining a lane for a vehicle. Accordingly, the visual inference system 100 may be one component of a larger system now shown in FIG. 1.

The visual inference system 100 includes various components for generating semantic information about the environment captured by an image. The visual inference system 100 shown in FIG. 1 includes an image sensor 110 along with an image region selection module 120 and a visual inference model 130. The visual inference model 130 is capable of interpreting images input to the model to determine semantic information in the image provided to the model. Typically, the image sensor 110 may capture images at a higher resolution than the resolution compatible for analysis by the visual inference model 130. An image at the resolution as captured by the image sensor is referred to herein as a "full-size image." In some configurations, the visual inference system 100 may be used to analyze images that were not captured by an image sensor in the visual inference system 100. In this instance, the full-size image may refer to an image received by the visual inference system 100 at a resolution higher than the resolution at which the visual inference model is configured to receive images.

The image region selection module 120 selects a region in the full-size image for analysis by the visual inference model 130. The visual inference system 100 may include additional components such as a control signal 140, a motion sensor 150, a location sensor 160, and environmental data 170, that may be used by the image region selection module 120 to select the region of the image to be analyzed by the visual inference model 130. Together, the information provided by these components, as well as the semantic information generated by the visual inference model 130 (e.g., from a prior image captured by the image sensor 100) describe a set of environmental characteristics that may be used by the region selection module 120 in selecting a region of the full-size image. In various configurations, any combination of the types of environmental characteristics may be used by the image region selection module 120 to select a part of the full-size image.

Various configurations of the visual inference system 100 may have different components related to environmental characteristics than those shown in FIG. 1 and thus use more or fewer types of information as environmental characteristics. For example, the image region selection module 120 may select a region without control information identified from the control signal 140 or without road structure information that may be determined from the environmental data 170 and location sensor 160.

The image sensor 110 captures images of the environment around the visual inference system 100. As an implementation for a vehicle, the image sensor 110 may be mounted on the front, side, or rear of the vehicle to capture images in the corresponding directions relative to the vehicle. The image sensor 110 typically includes an electronic sensor that captures a comparatively high-resolution image of the environment. As examples, the image sensor may capture images in resolutions such as 1024×768, 1920×1280, 2560×1920, or higher and may capture these images at various aspect ratios. In addition, the image sensor may capture sequential images to generate video of the environment at a particular frame rate.

The visual inference model 130 is a computer model that identifies semantic information in an image. The semantic information may identify objects and other characteristics of an environment in the image. For example, the visual inference model 130 may identify a type of object (e.g., identify a label "truck" for a portion of the image) as well as a location or bounding box of the object in the image. The visual inference model 130 may also identify other characteristics of the environment, such as the level of ambient light, weather conditions, traffic signals or signage, lane marker or lane identification, and various other features of the environment. Though described here as "a" model, the visual inference model 130 may be implemented as more than one model that operate sequentially or in parallel to generate the semantic information about the image. For example, multiple models may operate in parallel to identify different kinds of characteristics in the environment.

The visual inference model 130 may be implemented as a variety of machine-learned models or trainable networks. For example, the visual inference model 130 may be a neural network, decision tree, classifier, or other type of computer model, and any combination thereof, that identifies semantic information in the image provided to the visual inference model 130. The visual inference model 130 may be trained from a set of training data and images to learn weights and parameters for effectively performing the semantic analysis. The complexity of these networks and input resolution of images to the network may affect the processing time and accuracy of the visual inference model 130.

When the images generated by the image sensor 110 are sequentially generated as video, the speed at which the vision inference model 130 can process the images of the video may impact the number or portion of images (i.e., frames) of the video that can be processed by the visual inference module. For example, when the image sensor 110 captures 60 images per second, the vision inference model 130 may be designed to analyze 20, 30, or 60 of those frames. As one approach to control the speed of processing, and for other reasons, the vision inference model 130 may process images at a lower resolution than the full-size images. For example, the vision inference model 130 may directly receive images at a specified or pre-determined resolution of 600×400. The full-size image, or the selected portion thereof, may be resized to the resolution that can be received by the vision inference model 130.

The control signal 140 is used to identify control information of the vehicle or other structure on which the image sensor 110 is mounted. That is, the control signal 140 reflects information about the likely future movement of the image sensor 110 with respect to the environment shown in the image captured by the image sensor. When the visual inference system 100 is part of a vehicle, such as a car, the control signal 140 may reflect controls such as acceleration, brakes, and wheel position of the vehicle. The control signal 140 may represent or capture the controls as input by a user or driver of the vehicle, or may represent inputs from a computer or other automated control of the vehicle. These signals may be characterized and represented as control information for the vehicle.

The motion sensor 150 may be used to identify motion information of the vehicle that reflects the current movement of the vehicle in the environment. While the control information may reflect a future or expected change in movement of the image sensor 110 within the environment, the motion information describes the current movement of the image sensor 110 in the environment. The motion sensor 150 may include various types of sensors to describe the motion of the image sensor 110. As examples, the motion sensor 150 may include accelerometers, gyroscopes, speedometer, and other sensors to measure movement of the image sensor within the environment.

The location sensor 160 in conjunction with environmental data 170 may be used to identify a location of the visual inference system 100 and road structure information nearby in the environment. For example, the location sensor 160 may provide positioning information such as geographical coordinates of the location sensor 160. The geographical coordinates of the location sensor 160 may be used to access relevant environmental data 170. This access may be performed, for example, by a look-up or data access in the environmental data 170, which may provide information describing roads and road structure. For example, this data may designate road structure information to aid in identifying possible locations of other vehicles or objects and locations of future travel of the vehicle. Thus, the road structure information may indicate where roads turn, curve, or change in pitch (i.e., to increase or decrease elevation). The environmental data 170 may thus comprise map data for the physical environment near the visual inference system 100.

Figure 2:
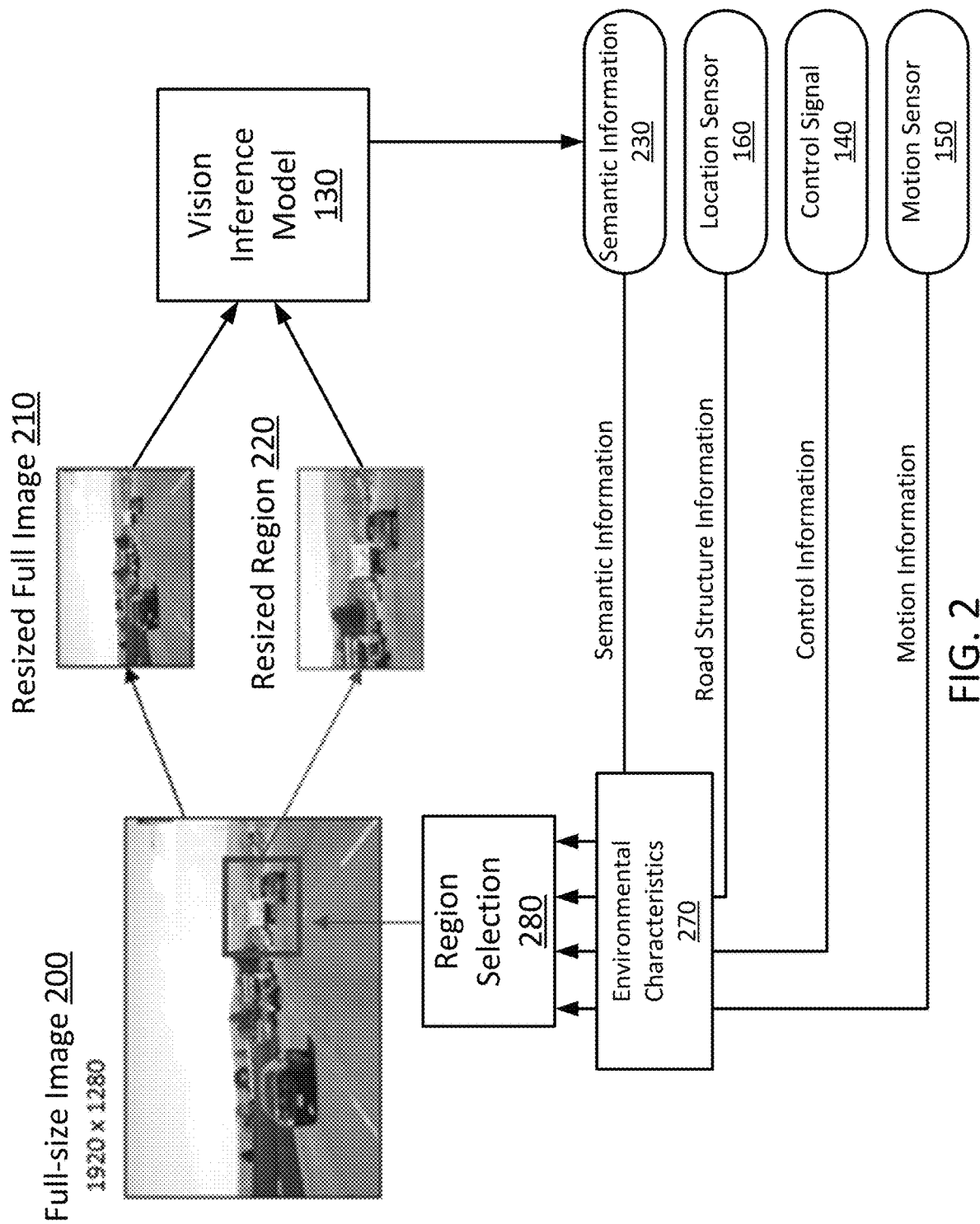
FIG. 2 illustrates an example data flow for semantic analysis of an image.

FIG. 2 illustrates an example data flow for semantic analysis of an image. A full-size image 200 may be received from the image sensor 110 or from another source. For use with the vision inference model 130, the full-size image 200 may be resized to a resized full image 210 at a resolution that may be used with the vision inference model 130. In addition, a selected region of the full-size image 200 may also be selected by the image region selection module 120. The selected region from the full-size image 200 may be resized to resized region 220 for use with the vision inference model 130. As shown, more than one resized image may be applied to the vision inference model 130 (e.g., the resized full image 210 and resized region 220). More than one region may be selected and resized for the vision inference model 130, and in other circumstances the full-size image 200 itself is not directly used for the vision inference model 130. The vision inference model 130 may be configured to use more than one image jointly, and in other circumstances may separately analyze each image and combine the semantic information determined from each image.

To select the region in the full-size image, the set of environmental characteristics 270 may be determined from various information as discussed above. The semantic information 230 included in the environmental characteristics 270 may be determined from a prior image, or may represent an accumulated set of semantic information from a set of prior images or other determined information about the environment, for example as determined by other portions of a perception system or from other sensor inputs. As noted above, the environmental characteristics 270 may also include road structure information, control information, and motion information based on data from the location sensor 160, control signal 140, and motion sensor 150, respectively.

The region selection module 120 may then perform region selection 280 in the full-size image 200 based on the set of environmental characteristics. The region selection 280 may select one or more regions based on the environmental characteristics 270 and may use one or more approaches for selecting a region. The selected region may vary in size, location, and aspect ratio as specified by the selection process, and thus permits the selection of any "interesting" characteristics in the environment. In general, the region selection 280 identifies regions that reflect areas of likely interest in the full-size image 200, as well as likely positions of travel of the visual inference system 100 and images captured by the image sensor 110. As an example, when the full-size image depicts a curve in a road, the region selection selects a region of the full-size image to focus the semantic analysis of the vision inference model 130 on the future travel of the vehicle to the turn in the road.

In one configuration, the region selection 280 uses a set of rules to identify the region. The rules may account for various information provided in the environmental characteristics. For example, the rules may designate that a region is selected that includes all objects identified in the semantic information 230. The rules may specify a region of the full-size image 200 based on values and characteristics of the information, and specify the size, location, and aspect ratio of the selected region based on the environmental characteristics.

In certain circumstances, the environmental characteristics 270 may lack a type of information. For example, the environmental data 170 may lack information regarding road structure for the location, in which case the rules may select a region based on other types of information.

In another configuration, the region selection 280 may determine a region to select from each type of information and use a combination (or weighted combination) of the regions from each type of information. For example, the semantic information may be used to identify a region that selects each object previously identified in the environment. When objects are approaching the vehicle, the size of the selected region may increase, while when objects become smaller, the size of the selected region may decrease. The road structure information may designate a direction in which the road turns in a direction of travel of the vehicle, along with curvature of that turn. The turn and its curvature may be used to select a region towards the turn, and the degree of curvature may affect the amount of the shift. In addition, a larger curvature may also increase the size of the selected region to increase the likelihood that additional portions of the curving road are captured in the selected region. That is, when the road turns significantly, the selected region may capture a larger portion of the image in the direction of the turn. Likewise, when a road curves upward or downward (e.g., the grade of the road increases or decreases), the selected region may shift upwards or downwards to capture the road's position in the full-size image as being above or below the center of the full-size image. Likewise, control and motion information may show that the vehicle is traveling or about to travel to the left or right, or is moving (or will move) faster or slower. Control or motion information indicating a turn to the left or right may be used to shift the selected region in the same direction. As with the road structure information, a sharper left or right turn may also increase the shift and may also increase the size of the selected region to capture additional information in the direction of the turn. Likewise, the speed of the vehicle (e.g., current or expected speed due to controls to accelerate or brake) may increase or decrease the size of the selected region. When the vehicle moves faster, a smaller region may be selected to increase the focus of the semantic information on identification of objects in front of the vehicle which will be quickly reached by the vehicle. Likewise, when the vehicle moves slowly, the selected region may be larger to identify a broader field of view given the relatively longer time for a vehicle to reach more distant objects in the image.

Each of these types of information may thus be used to output parameters for selecting the region, which may be combined in selecting the final region of the full-size image 200.

As an additional example, the selected region may be based on a trained model, such as a decision tree or neural network. This model may be trained separate to the use of the trained model, for example at another system or otherwise "offline." To train the model, training data including many full-size images may be provided along with selections of "most-relevant" or "most-interesting" regions of the image. This data may be determined by human labeling of the full-size images, or by monitoring human eye focus while viewing full-size images. In addition, the data may be automatically labeled based on objects identified by a vision inference model, such that the areas of a full-size image with the greatest detail and semantic information are labeled and used as the training data for selecting the region. In this configuration, the trained model for region selection may learn the relationship between the environmental characteristics 270 and the identified regions in the training data.

Figure 3:
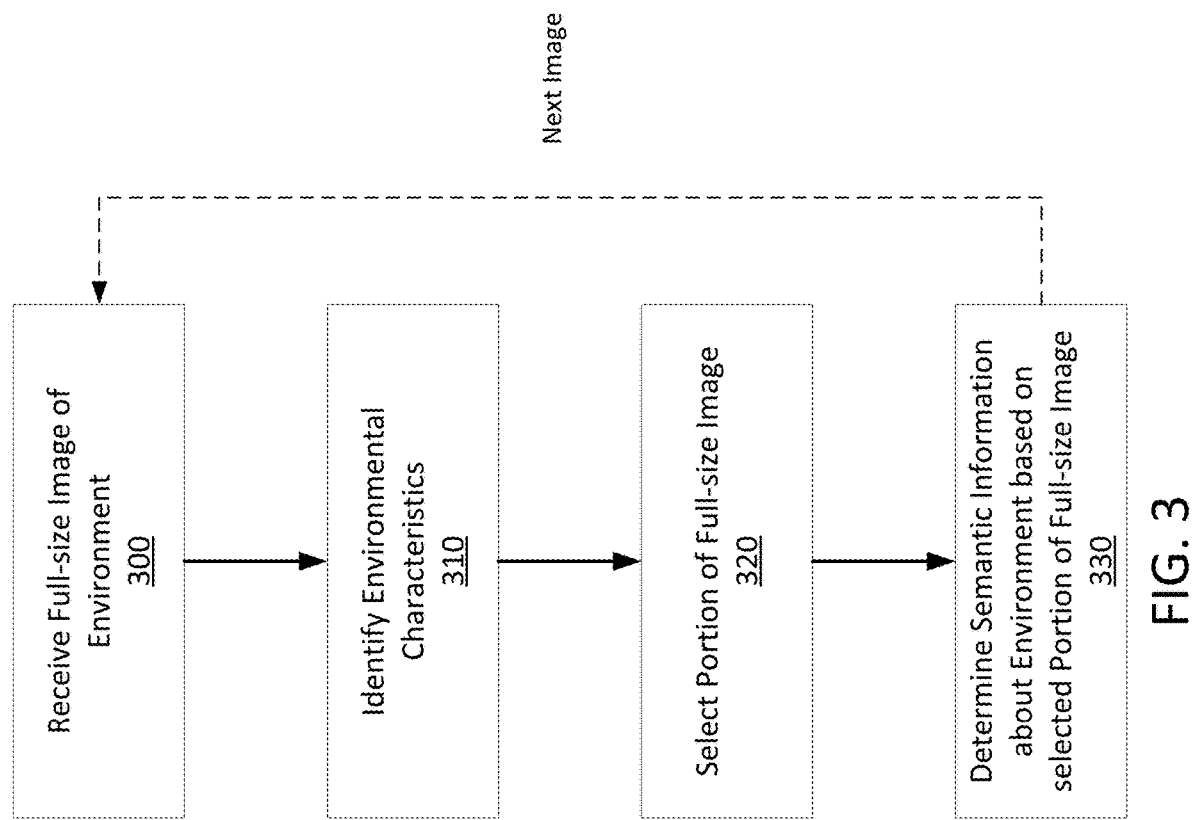
FIG. 3 illustrates one example method for semantic analysis with a region selected from a full-size image.

FIG. 3 illustrates one example method for semantic analysis with a region selected from a full-size image. This method may be performed, for example, by the visual inference system 100. Initially, a full-size image of the environment is received 300, for example from an image sensor 110. The full-size image may be a frame of video or otherwise in a series of images captured of the environment.

To select a region, environmental characteristics are identified 310 of the environment and information about the conditions in which the image was captured. These may describe semantic information, such as from analysis of a prior image or images of the environment, as well as other information like road structure information, control information, or motion information relating to a vehicle on which the image sensor capturing the image is mounted. As discussed above, these environmental characteristics may be used to select 320 a portion or region of the full-size image, for example based on a set of rules, weights, or a trained model as discussed above.

The selected region of the full-size image of the environment is then used to determine 330 semantic information in the environment. Before being used with a semantic inference model, the selected region may also be resized to a size compatible with the inputs for the semantic inference model. In circumstances in which the image is one of a series of images, the process may repeat when another image in the series of images is received. This permits the semantic information from one image to influence selection of a region for the next image, and allows dynamic selection of a region in the full-size image for analysis.

Figure 4:
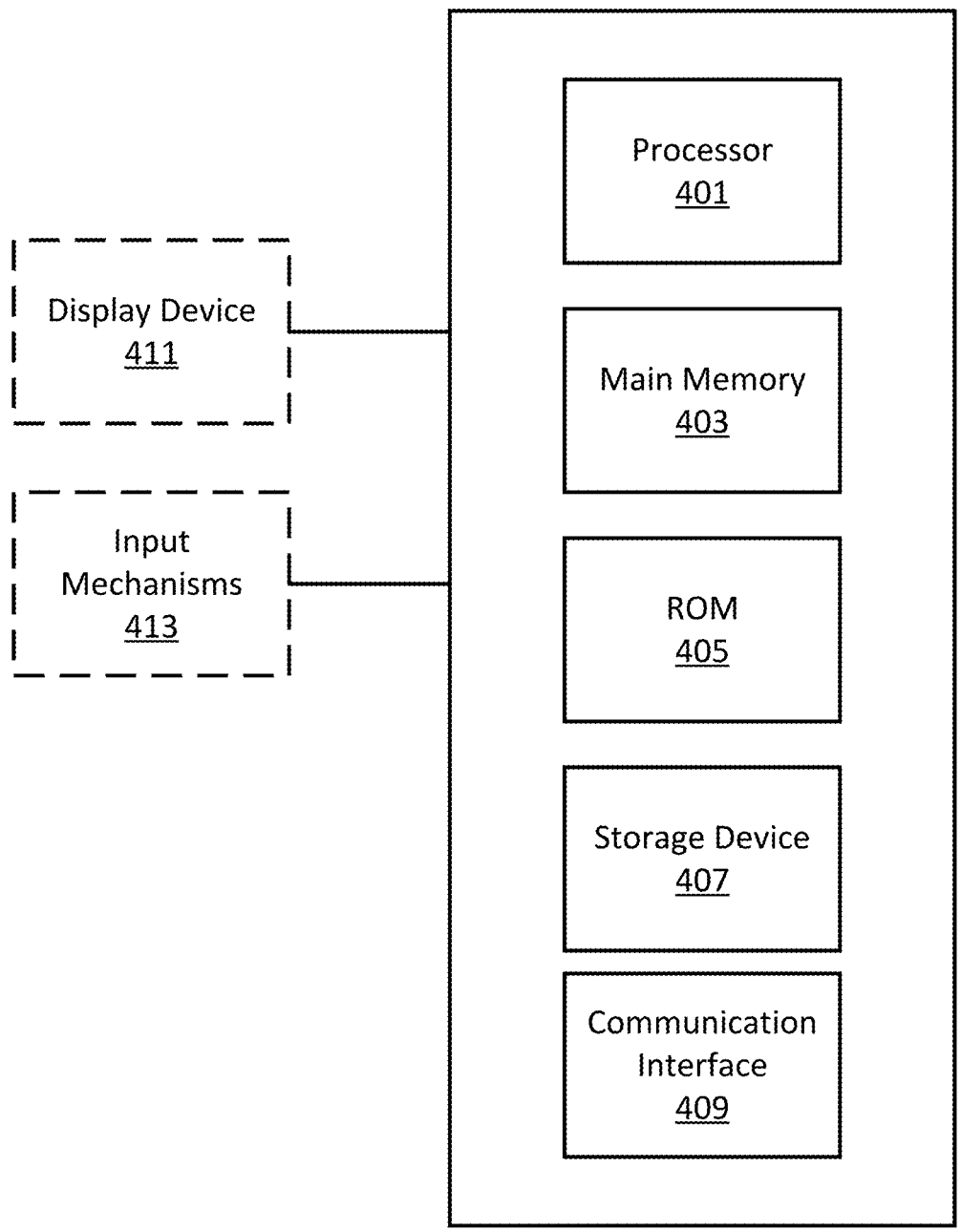
FIG. 4 is system diagram of a computer system, according to one embodiment.

FIG. 4 is a diagram illustrating a computer system 400 upon which embodiments described herein may be implemented within the visual inference system 100. For example, in the context of FIG. 1, the computing modules such as the image region selection module 120 and visual inference model 130 may be implemented using a computer system such as described by FIG. 4. The visual inference system 100 may also be implemented using a combination of multiple computer systems as described by FIG. 4.

In one implementation, the visual inference system 100 includes processing resources 401, main memory 403, read only memory (ROM) 405, storage device 407, and a communication interface 409. The visual inference system 100 includes at least one processor 401 for processing information and a main memory 403, such as a random access memory (RAM) or other dynamic storage device, for storing information and instructions to be executed by the processor 401. Main memory 403 also may be used for storing temporary variables or other intermediate information during execution of instructions to be executed by processor 401. Visual inference system 100 may also include ROM 405 or other static storage device for storing static information and instructions for processor 401. The storage device 407, such as a magnetic disk or optical disk or solid state memory device, is provided for storing information and instructions.

The communication interface 409 can enable the visual inference system 100 to communicate through use of a communication link (wireless or wireline). Using the communication link, the visual inference system 100 can communicate with different subsystems and may enable autonomous operation of a vehicle. In some variations, the visual inference system 100 can be configured to receive sensor data (e.g., such as GPS data) from one or more location tracking devices (such as location sensor 160) in the computer system 400. The sensor data can be processed by the processor 401 and can be stored in, for example, the storage device 407. The processor 401 can process the sensor data of a location tracking device to determine the location and trajectory of the vehicle.

The visual inference system 100 can optionally include a display device 411, such as a cathode ray tube (CRT), an LCD monitor, an LED monitor, a TFT display or a television set, for example, for displaying graphics and information to a user. An input mechanism 413, such as a keyboard that includes alphanumeric keys and other keys, can optionally be coupled to the computer system 400 for communicating information and command selections to processor 401. Other non-limiting, illustrative examples of input mechanisms 413 include a mouse, a trackball, touch-sensitive screen, or cursor direction keys for communicating direction information and command selections to processor 401 and for controlling cursor movement on display device 411.

Examples described herein are related to the use of the visual inference system 100 for implementing the techniques described herein. According to one embodiment, those techniques are performed by the visual inference system 100 in response to processor 401 executing one or more sequences of one or more instructions contained in main memory 403. Such instructions may be read into main memory 403 from another machine-readable medium, such as storage device 407. Execution of the sequences of instructions contained in main memory 403 causes processor 401 to perform the process steps described herein. In alternative implementations, hard-wired circuitry may be used in place of or in combination with software instructions to implement examples described herein. Thus, the examples described are not limited to any specific combination of hardware circuitry and software.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for automated vision inference of an environment in an image, comprising:
   receiving a full-size image of an image of an environment;
   identifying a set of environmental characteristics of the image, the set of environmental characteristics describing the environment in which the full-size image was captured;
   selecting a portion of the full-size image for automated vision inference based on the set of environmental characteristics of the image; and
   determining semantic information about the environment in the image by applying the selected portion of the image to a vision inference model.

2. The method of claim 1, further comprising resizing the selected portion of the image to a predetermined size for the vision inference model.

3. The method of claim 1, wherein the set of environmental characteristics of the image includes one or more of:
   semantic information determined from a previous image of the environment;
   road structure information describing a curvature of a road in the environment in view of the image; and
   control or motion information of a vehicle from which the image was captured.

4. The method of claim 1, wherein selecting the portion of the image based on the set of environmental characteristics of the image comprises applying a set of rules to the set of environmental characteristics, applying a set of weights to the set of environmental characteristics, or applying a trained computer model to the set of environmental characteristics.

5. The method of claim 1, wherein the determined semantic information about the environment comprises a set of objects identified in the environment and bounding areas in the image for the set of objects.

6. The method of claim 1, wherein the full-sized image is resized to a reduced-resolution image and semantic information about the environment in the image is also determined by applying the reduced-resolution image to the vision inference model.

7. The method of claim 1, wherein the vision inference model is a machine-learned neural network model.

8. The method of claim 1, wherein another portion of the image is selected based on the set of environmental characteristics of the image, and the semantic information is further determined based on the other portion of the image.

9. A non-transitory computer-readable medium including instructions executable by a processor, the instructions causing the processor to perform steps of:
   receiving a full-size image of an image of an environment;
   identifying a set of environmental characteristics of the image, the set of environmental characteristics describing the environment in which the full-size image was captured;
   selecting a portion of the full-size image for automated vision inference based on the set of environmental characteristics of the image; and
   determining semantic information about the environment in the image by applying the selected region of the image to a vision inference model.

10. The non-transitory computer-readable medium of claim 9, the instructions further causing the processor to perform a step of resizing the selected portion of the image to a predetermined size for the vision inference model.

11. The non-transitory computer-readable medium of claim 9, wherein the set of environmental characteristics of the image includes one or more of:
    semantic information determined from a previous image of the environment;
    road structure information describing a curvature of a road in the environment in view of the image; and
    control or motion information of a vehicle from which the image was captured.

12. The non-transitory computer-readable medium of claim 9, wherein selecting the portion of the image based on the set of environmental characteristics of the image comprises applying a set of rules to the set of environmental characteristics, applying a set of weights to the set of environmental characteristics, or applying a trained computer model to the set of environmental characteristics.

13. The non-transitory computer-readable medium of claim 9, wherein the determined semantic information about the environment comprises a set of objects identified in the environment and bounding areas in the image for the set of objects.

14. The non-transitory computer-readable medium of claim 9, wherein the full-sized image is resized to a reduced-resolution image and semantic information about the environment in the image is also determined by applying the reduced-resolution image to the vision inference model.

15. The non-transitory computer-readable medium of claim 9, wherein the vision inference model is a machine-learned neural network model.

16. The non-transitory computer-readable medium of claim 9, wherein another portion of the image is selected based on the set of environmental characteristics of the image, and the semantic information is further determined based on the other portion of the image.

17. A system comprising:
a processor; and
a computer-readable medium comprising instructions executable on the processor for:
receiving a full-size image of an image of an environment;
identifying a set of environmental characteristics of the image, the set of environmental characteristics describing the environment in which the full-size image was captured;
selecting a portion of the full-size image for automated vision inference based on the set of environmental characteristics of the image; and
determining semantic information about the environment in the image by applying the selected portion of the image to a vision inference model.

18. The system of claim 17, the instructions further executable on the processor for resizing the selected portion of the image to a predetermined size for the vision inference model.

19. The system of claim 17, wherein the set of environmental characteristics of the image includes one or more of:
semantic information determined from a previous image of the environment;
road structure information describing a curvature of a road in the environment in view of the image; and
control or motion information of a vehicle from which the image was captured.

20. The system of claim 17, wherein selecting the portion of the image based on the set of environmental characteristics of the image comprises applying a set of rules to the set of environmental characteristics, applying a set of weights to the set of environmental characteristics, or applying a trained computer model to the set of environmental characteristics.

* * * * *